US009305082B2

(12) United States Patent
Dorr et al.

(10) Patent No.: US 9,305,082 B2
(45) Date of Patent: Apr. 5, 2016

(54) SYSTEMS, METHODS, AND INTERFACES FOR ANALYZING CONCEPTUALLY-RELATED PORTIONS OF TEXT

(75) Inventors: Dietmar H. Dorr, Eagan, MN (US);
Masoud Makrehchi, Waterloo (CA);
Carol Steele, Apple Valley, MN (US)

(73) Assignee: Thomson Reuters Global Resources, Baar (CH)

( * ) Notice: Subject to any disclaimer, the term of this patent is extended or adjusted under 35 U.S.C. 154(b) by 144 days.

(21) Appl. No.: 13/249,760

(22) Filed: Sep. 30, 2011

(65) Prior Publication Data

US 2013/0086470 A1   Apr. 4, 2013

(51) Int. Cl.
| G06F 17/21 | (2006.01) |
|---|---|
| G06F 17/30 | (2006.01) |
| G06F 17/27 | (2006.01) |
| G06Q 10/10 | (2012.01) |
| G06Q 50/18 | (2012.01) |

(52) U.S. Cl.
CPC ........ *G06F 17/30705* (2013.01); *G06F 17/277* (2013.01); *G06F 17/2735* (2013.01); *G06Q 10/10* (2013.01); *G06Q 50/18* (2013.01)

(58) Field of Classification Search
CPC .............................. G06F 17/27; G06F 17/277
USPC ......................................................... 715/256
See application file for complete search history.

(56) References Cited

U.S. PATENT DOCUMENTS

| 2007/0016571 | A1* | 1/2007 | Assadian et al. .................. 707/5 |
|---|---|---|---|
| 2008/0319738 | A1* | 12/2008 | Liu ........................ G06F 17/277 704/10 |
| 2010/0223280 | A1* | 9/2010 | Schneider ..................... 707/769 |
| 2011/0055206 | A1* | 3/2011 | Martin et al. ................. 707/723 |

OTHER PUBLICATIONS

International Search Report and Written Opinion of the International Searching Authority issued for the corresponding PCT International Application No. PCT/IB12/03041 on Sep. 25, 2013.

\* cited by examiner

*Primary Examiner* — Laurie Ries
*Assistant Examiner* — Zaida I Marrero (57) ABSTRACT

A method includes analyzing a cluster of conceptually-related portions of text to develop a model and calculating a novelty measurement between a first identified conceptually-related portion of text and the model. The method further includes transmitting a second identified conceptually-related portion of text and a score associated with the novelty measurement from a server to an access device via a signal. Another method includes determining at least two corpora of conceptually-related portions of text. The method also includes calculating a common neighbors similarity measurement between the at least two corpora of conceptually-related portions of text and if the common neighbors similarity measurement exceeds a threshold, merging the at least two corpora of conceptually-related portions of text into a cluster or if the common neighbors similarity measurement does not exceed a threshold, maintaining a non-merge of the at least two corpora of conceptually-related portions of text.

21 Claims, 9 Drawing Sheets

Top-Down Hierarchical Clustering

FIG. 7A

Bottom-Up Hierarchical Clustering

FIG. 7B

SYSTEMS, METHODS, AND INTERFACES FOR ANALYZING CONCEPTUALLY-RELATED PORTIONS OF TEXT

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2011 Thomson Reuters.

TECHNICAL FIELD

Various embodiments of the present invention concern systems, methods and interfaces for analyzing conceptually-related portions of text, in particular contracts and contract clauses.

BACKGROUND

Interacting with contracts is becoming an everyday part of life. Renters and landlords sign a written contract (i.e., a lease) to establish each party's rights and responsibilities with respect to the property being rented. A home purchase typically requires the buyer's signature on multiple documents/contracts to establish the buyer's responsibility to pay the mortgage and not rescind the offer that was agreed upon and the seller's responsibility that the seller keeps the promises that were warranted. Consumers download a piece of software on their computers and have to click "I Agree" to accept the terms of an end user license agreement. Employees sign an employment agreement binding them to the company's rules and regulations while employed and sometimes, thereafter.

For the people that draft these contracts, the language in each contract clause and/or the contract as a whole is important. Therefore, the language needs to be assessed to protect the client's interests. For some contractual situations, hours, days and/or weeks are spent ensuring the "right" or correct language is used to address the specific needs of the situation. This is done through drafting and, sometimes, negotiation. However, a common challenge that contract drafting personnel face is determining if he/she is using the most beneficial language for the client's situation.

Currently, a known approach to analyzing contracts and contract clauses includes a manual component of asking another person, perhaps someone with more expertise on the subject, which language is best for the situation. While having access to this type of expertise may provide some benefit, the person drafting the contract may not have time to reach out to another individual and/or that individual might be too busy to lend his/her expertise. In addition, the individual being asked may know more about the area than the person drafting but may not be a true expert.

Another known approach is looking through other contracts and contract clauses. For example, some law firms might have a document repository where all the contracts are stored. A lawyer searches the repository to bring up a particular set of contracts and/or contract clauses that might be applicable to the client's situation. However, this type of system does not analyze the contracts and contract clauses to determine what might be the "market standard" language.

Market standard language refers to language that is generally accepted by members of a market. For example, the market standard language for a non-compete clause in a salesperson's employment agreement might be different than the market standard language for a non-compete clause in an engineer's employment agreement.

Additionally, each known approach described above consumes a tremendous amount of valuable time. For example, when attempting to engage an individual with more expertise, the drafter may have to work around the individual's schedule which may be cumbersome and time consuming. In addition, that individual may not have the time necessary to discuss the various options of contract language. In another example, when searching other contracts and clauses, several precious hours may be wasted trying to find the necessary language for the drafter's scenario with the potential for little to no success. This practice is inconvenient and wastes multiple hours of researching language instead of focusing on other important aspects like, for example, the discussion and negotiation with opposing counsel.

Accordingly, the inventors have recognized the necessity for additional improvements in analyzing conceptually-related portions of text, in particular contracts and contract clauses.

SUMMARY

The invention allows for analyzing a cluster of conceptually-related portions of text (e.g., a cluster of contracts) to develop a model contract. Then the model contract is used to calculate a novelty measurement between an individual contract and the model contract. Finally, the individual contract may be transmitted and ultimately displayed to the user along with a score that is associated with the corresponding novelty measurement. Additionally, the invention permits determining two corpora of contracts and calculating a common neighbors similarity measurement between the two corpora of contracts. Furthermore, if the common neighbors similarity measurement exceeds a threshold, the two corpora of contracts are merged into a cluster. However, if the common neighbors similarity measurement does not exceed a threshold, the two corpora of contracts do not merge and maintain separate corpora of contracts.

The systems, methods and interfaces described herein advantageously provide direct access to a large corpus of contracts that are analyzed and scored for conformity and/or novelty to market standard contract language. Each clause of the contract is scored, as is each contract. Advantageously, the invention allows users (e.g., attorneys, paralegals, contract negotiators and managers and other legal professionals) to identify the market standard language for an agreement and its clause types in order to: 1) help attorneys manage and possibly avoid risk for their clients by giving them confidence in each clause of the contract as well as the contract they have drafted; 2) save time, effort, and energy; and 3) allow attorneys to focus on "lawyering." In addition, the invention allows a user (e.g., an attorney) the flexibility to search contracts and contract clauses to determine what type of language is best for the user's situation. Furthermore, the invention allows one to look at scores that indicate a significant deviation from the market standard in case an attorney needs to find specific non-market standard language.

DETAILED DESCRIPTION OF THE EXEMPLARY EMBODIMENT(S)

The description includes many terms with meanings derived from their usage in the art or from their use within the context of the description. However, as a further aid, the following examples are presented. The term "conceptually-related portion of text" or "conceptually-related portions of text" includes but is not limited to words, sentences, paragraphs, clauses, and/or documents. Types of conceptually-related portions of text may include contract clauses, contracts, contract sentences, SEC filing clauses, SEC filing sentences, SEC filing documents and/or any portion of text that could be clustered into a taxonomy. The term "corpus" includes a grouping of conceptually-related portions of text. The term "corpora" is the plural of the term "corpus" and may include a cluster. The term "cluster" includes a merged set of at least two corpora of conceptually-related portions of text. The term "common neighbors similarity measurement" is the probability that two corpora share similar neighbors. Thus, if the neighbors of the two corpora are similar then the two corpora are similar. The term "novelty measurement" is a value of how novel (i.e., new) the first identified conceptually-related portion of text is from the model. Put another way, how different is the wording of the first identified conceptually-related portion of text from the model. In some embodiments, the novelty measurement is a value between or including 0 and 1. The term "model" is a statistical language model that assigns a probability to a sequence of X words. The term "score" is a value that is associated with a novelty measurement. Exemplary scores include contract clause scores and contract scores that are associated with their respective novelty measurements. The term "first identified conceptually-related portion of text" includes a conceptually-related portion of text that is being used to calculate a novelty measurement. The term "second identified conceptually-related portion of text" includes a conceptually-related portion of text that is being transmitted to an access device.

Exemplary System

Figure 1:
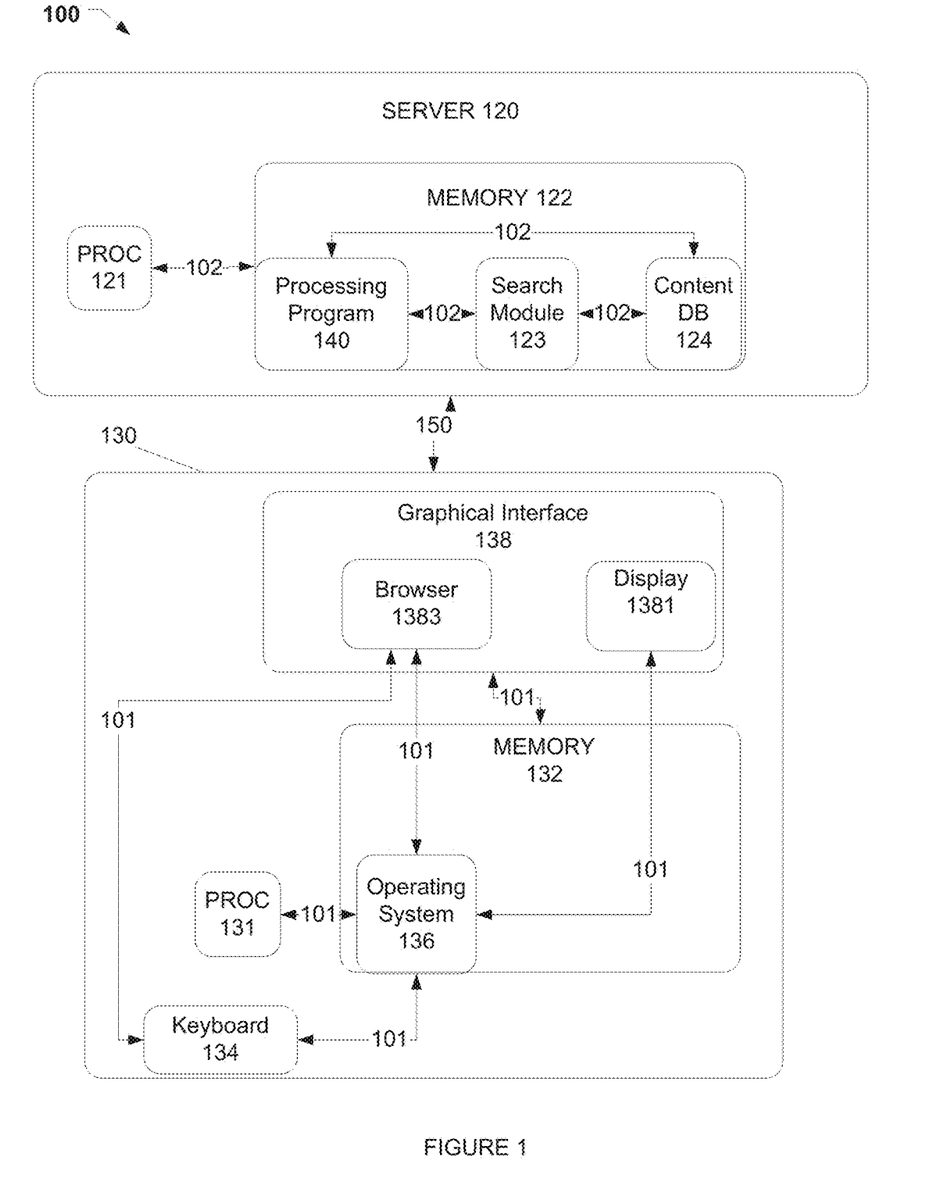
FIG. 1 is an exemplary system 100 which corresponds to one or more embodiments of the invention.

FIG. 1 shows an exemplary system 100, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. Server 120 includes a processor 121 and a memory 122, wherein the memory 122 further includes a processing program module 140, a search module 123, and a content database 124. All of the components within server 120 are connected via computer bus 102, which is shown in various pathways. Computer buses 101, 102 and/or 103 are buses that transmit information between the access device's components/elements and/or between multiple access devices. For example, computer bus 101 and computer bus 102 aid in transmitting information (e.g., a signal) between access device 130 and server 120. Processor 121 may use computer bus 102 to queue a request that is to be transmitted through a signal, from server 120, via a wireless or wireline transmission channel 150 and is then ultimately received by processor 131 through the utilization of computer bus 101. Generally, server 120 transmits the signal via a wireless or wireline transmission channel 150 to at least one access device, such as access device 130. Supplementing the previous example, the signal from server 120 may be associated with a request to display a second identified conceptually-related portion of text and a score associated with the novelty measurement on access device 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a search module 123, a content database 124 and a processing program 140.

Search module 123 includes one or more search engines and related user-interface components (not shown), for receiving and processing queries against content database 124. Content database 124 takes the exemplary form of one or more electronic, magnetic, and/or optical data-storage devices. Content database 124 includes content relating to conceptually-related portions of text, data associated with conceptually-related portion of text and/or a sub-set of content that only includes subscriber content. Subscriber content includes content and related data for controlling, administering, and managing pay-as-you-go and/or subscription based access. For instance, a user may have to subscribe to an information retrieval service (e.g., Westlaw Business). The content is stored in the content database 124 and cannot be accessed until a set of user credentials are authenticated. For instance, user credentials may be a user name and associated password. Once the credentials are successfully authenticated on server 120, the signal, including a second identified conceptually-related portion of text and a score associated with the novelty measurement, is transmitted via the wireless or wireline transmission channel 150 to access device 130. For purposes described herein, successfully authenticating a set of user credentials means the user credentials were accepted by an authentication system (not shown but well known to those skilled in the art). This successful authentication allows for receiving and/or transmitting the identified conceptually-related portion of text and the score associated with the novelty measurement.

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor 131. For example, the keyboard 134 sends inputs, via computer bus 101, to the operating system 136. The operating system 136 then determines the processing program 140 needs to be utilized, engages the processing program 140 through the signal via a wireless or wireline transmission channel 150, accepts the processing program output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When the processing program 140 is initiated, a display 1381 is defined in memory 132 and rendered on graphical interface 138. Upon rendering, the graphical interface 138 presents the data/results in association with the set of instructions from the processing program 140 as further discussed herein.

Figure 1A:
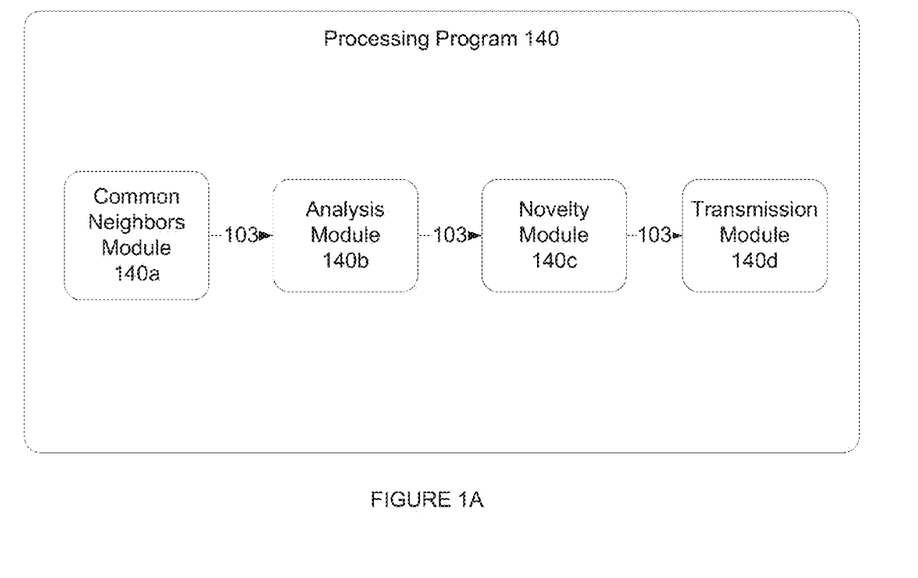
FIG. 1A is a more detailed view of the processing program 140 of FIG. 1 which corresponds to one or more embodiments of the invention.

FIG. 1A illustrates an exemplary embodiment of a processing program 140. The processing program 140 is configured to execute a set of modules from memory 122. The modules include a common neighbors module 140a, an analysis module 140b, a novelty module 140c, and a transmission module 140d. Each module is described herein. The common neighbors module 140a is configured to determine at least two corpora of conceptually-related portions of text. The common neighbors module 140a is also configured to calculate a common neighbors similarity measurement between the at least two corpora of conceptually-related portions of text. The method for calculating the common neighbors similarity measurement is further described herein. If the common neighbors similarity measurement exceeds a threshold, the common neighbors module 140a is configured to merge the at least two corpora of conceptually-related portions of text into a cluster. A threshold is determined such that only a high-value common neighbor similarity measurement proceeds to merge the two corpora. For example, a threshold may range from 0 to 1. Having the common neighbors similarity measurement meet or surpass a high threshold (i.e., closer to 1) gives a strong indication that the two corpora should be merged due to similarity. Having the common neighbors similarity measurement meet a lower the threshold (i.e., closer to 0) does not give the same indication of comfort that the two corpora should be merged. Therefore, a higher threshold may provide a more precise and accurate merging of corpora. Techniques for determining a threshold are well known to those skilled in the art. On the other hand, if the common neighbors similarity measurement does not exceed a threshold, the common neighbors module 140a is configured to maintain a non-merge of the at least two corpora of conceptually-related portions of text. For example, the common neighbors module 140a is configured to determine at least two corpora of contracts. The common neighbors similarity measurement between the two corpora of contracts is calculated and a determination is made on whether the calculation exceeds the threshold. If the calculation exceeds the threshold, the two corpora of contracts are merged into a cluster. If the calculation does not exceed the threshold, the two corpora of contracts remain separate corpora. In another example, a common neighbors similarity measurement may be calculated between two clusters (i.e., each cluster being a merged set of at least two corpora) to determine if these two clusters should be merged into a new, larger cluster. The common neighbors similarity measurement is calculated until, eventually, the clusters are merged into one root cluster (i.e., root node). See bottom-up clustering approach discussed herein.

The analysis module 140b is configured to analyze a cluster of conceptually-related portions of text to develop a model. The analysis module 140b executes a portion of method 200 (see FIG. 2) to analyze the cluster of conceptually-related portions of text to develop the model. Further descriptions of analyzing a cluster of conceptually-related portions of text to develop a model are discussed in the exemplary method section. After the analysis module 140b has completed operation of analyzing a cluster of conceptually-related portions of text to develop a model, the model is used in the novelty module 140c.

The novelty module 140c is configured to calculate a novelty measurement between a first identified conceptually-related portion of text and the model. The novelty module 140c executes a portion of method 200 (see FIG. 2) to calculate a novelty measurement between a first identified conceptually-related portion of text and the model. Further descriptions of calculating a novelty measurement between a first identified conceptually-related portion of text and the model are discussed in the exemplary method section. After the novelty module 140c has completed the operation of calculating a novelty measurement, the novelty measurement is associated with a score and the score is used in the transmission module 140d.

The transmission module 140d is configured to transmit a second identified conceptually-related portion of text and a score associated with the novelty measurement. The transmission of a signal, via a wireless or wireline transmission channel 150, which includes a second identified conceptually-related portion of text and a score associated with the novelty measurement, occurs from server 120 to access device 130. In some embodiments, the first identified conceptually-related portion of text and the second identified conceptually-related portion of text are identical. Further explanation on these exemplary embodiments is described herein.

Exemplary Method as Conducted by System 100

Figure 2:
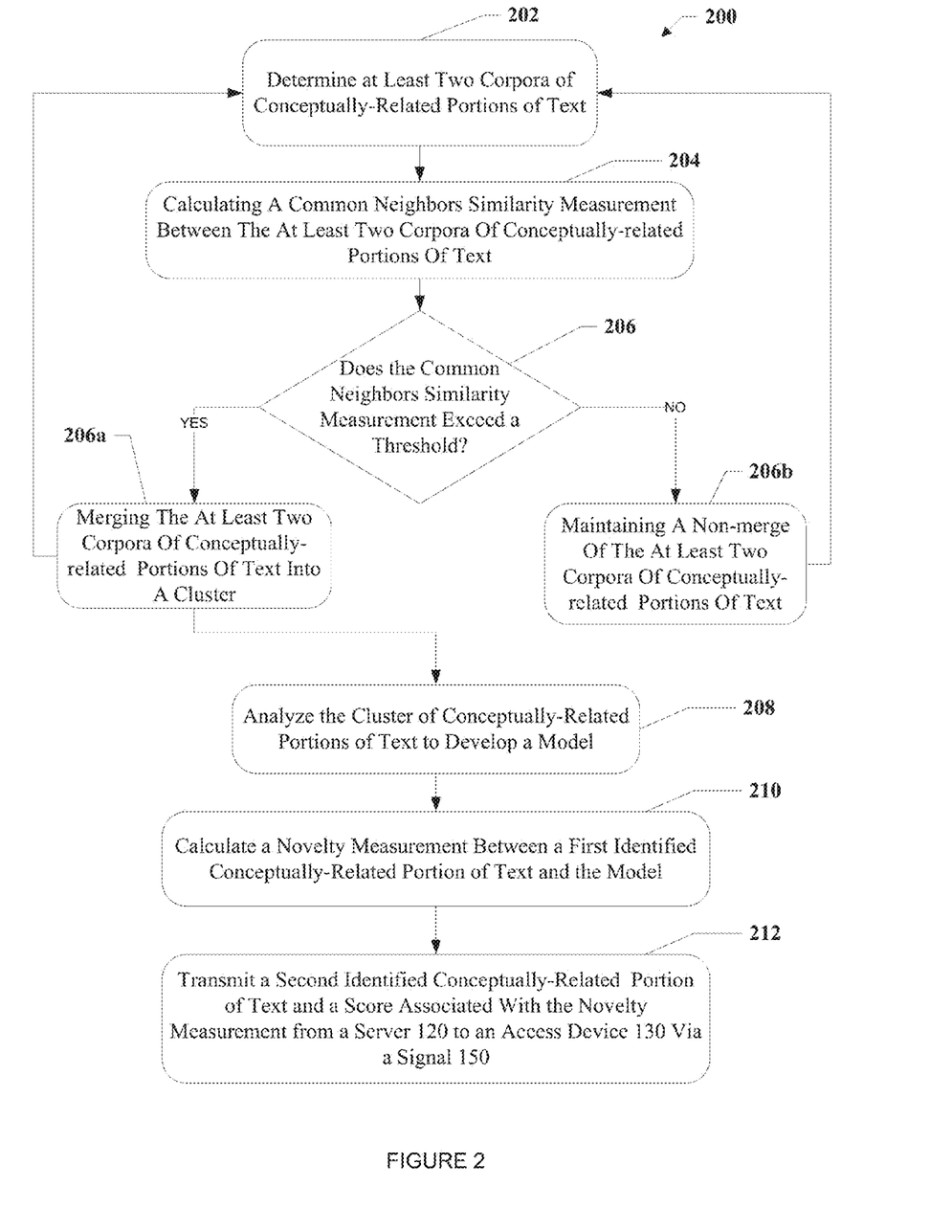
FIG. 2 is an exemplary method 200 which corresponds to one or more embodiments of the invention.

Referring now to FIG. 2, system 100 is configured to implement method 200. Method 200 includes functional blocks 202-212 and sub-blocks 206a-b. These functional blocks are steps that perform actions including assignments, decisions, assessments and other like functions. Additionally, in exemplary method 200, contract, contract clause and/or the plurality of each are consistent examples of conceptually-related portion(s) of text.

Prior to method 200 commencing, the content database 124 contains all the contracts that may be potentially clustered. Before the clustering begins, all the contracts are grouped by contract title. An exemplary method of grouping by contract title includes 1) removing stop words (e.g., "a," "the," or "with") and entities within a contract title; 2) stemming the remaining words in the contract title; and 3) sorting alphabetically the stemmed versions of the remaining contract title words. The process of stemming uses linguistic analysis to get to the root form of a word. For example, if the user enters "viewer" as the query, the process of stemming reduces the word to its root (i.e., "view"). Stemming techniques are known to those skilled in the art. After the sorting has occurred, a natural grouping of contract titles emerges. For example, Contract Title A states "Microsoft Lease Agreement" and Contract Title B states "Agreement for Leases." Applying the three step grouping approach above leaves a stemmed, sorted version of Contract Title A "Agree Lease" and a stemmed, sorted version of Contract Title B "Agree Lease." Therefore, a natural grouping of Contract A and Contract B emerges.

Once the contracts are grouped by title, in some embodiments, a static or dynamic grouping threshold is utilized to determine which groupings (i.e., each grouping is a corpus) are used for the calculation of the common neighbors similarity measurement. For example, a static grouping threshold implements a rule that all corpora containing 20 contracts or less are not eligible for the common neighbors similarity measurement. In another example, a dynamic grouping threshold is calculated by estimating cumulated distribution of the corpus size probability of all contracts and determining that only 80% of the corpora need to be clustered using the common neighbors similarity measurement. Cumulated distribution is well known to those skilled in the art. Either way, in some embodiments, only certain corpora are clustered using a common neighbors similarity measurement. The contracts contained in the corpora not clustered using the common neighbors similarity measurement are considered orphans and are processed later in method 200. For example, corpus A contains 15 contracts and corpus B contains 150 contracts. Using the static grouping threshold, corpus A would not be clustered using the common neighbors similarity measurement whereas corpus B would be clustered the using common neighbors similarity measurement. Furthermore, the contracts contained in corpus A are considered orphans and are processed later in method 200. In other embodiments, all the corpora are clustered using the common neighbors similarity measurement regardless of the static and/or dynamic grouping threshold.

In step 202, a determination of at least two corpora of contracts occurs. For example, two corpora could be "agree lease" and "agree employ" after the grouping approach is completed as described above. Once at least two corpora of contracts are determined, the process moves to step 204.

Figure 7A:
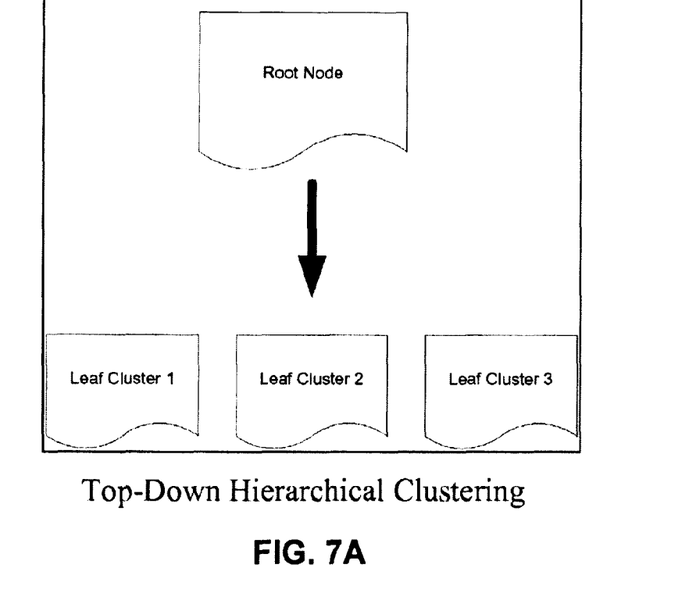
FIG. 7A is an exemplary hierarchical clustering which corresponds to one or more embodiments of the invention.
Figure 7B:
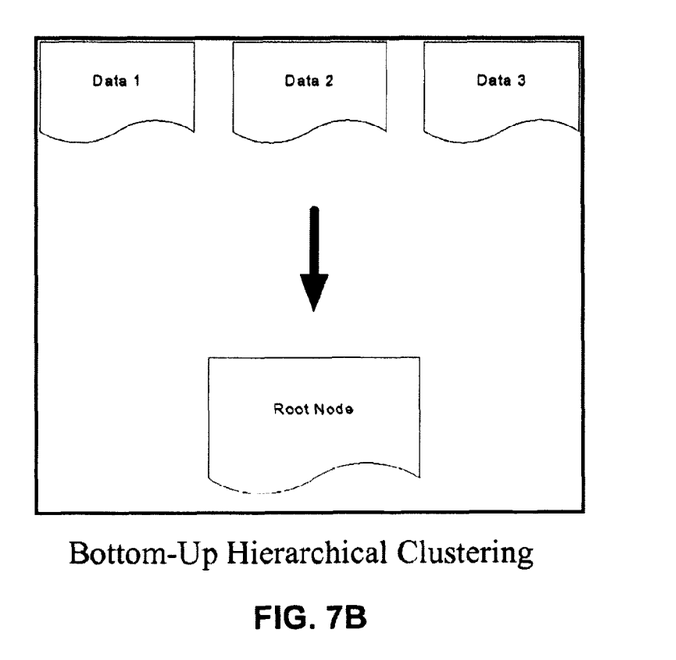
FIG. 7B is an exemplary hierarchical clustering which corresponds to one or more embodiments of the invention.

In step 204, a common neighbors similarity measurement is calculated between the at least two corpora of contracts. The common neighbors similarity measurement utilizes hierarchical clustering, in particular, agglomerative clustering. There are two common hierarchical clustering approaches: top-down or bottom-up. As illustrated in FIG. 7A, in the top-down approach, clustering starts with one root cluster (i.e., root node) and recursively splits every cluster until all leaf clusters (i.e., child nodes) are reached. As illustrated in FIG. 7B, in the bottom-up or agglomerative clustering approach, clustering starts with a piece of individual data (e.g., corpora) and merges similar pieces of individual data (e.g., multiple corpora) to create a cluster. Furthermore, the merging of similar clusters continues until only one cluster (i.e., a root node) is left.

In order to calculate the common neighbor similarity measurement, first, a centroid C is determined for each corpus. The centroid for each corpus is a representative document vector where C is a (q×m) matrix (q is the number of documents and m is the number of terms (words) in a dictionary). Next, a centroid to centroid similarity matrix is calculated by estimating Cosine distance of every pair of centroids:

$$D_{ij} = \frac{C_i * C_j}{|C_i||C_j|} \quad (1)$$

where $D_{ij}$ quantifies the strength of the similarity of the centroid pairing of two corpora i and j. A centroid to centroid similarity matrix is calculated for each corpus pairing. Next, the centroid to centroid similarity matrix D for each corpus pairing is transformed to an adjacency matrix A for each corpus pairing using the following formula:

$$A_{ij} = \begin{cases} 1, & D_{ij} \geq \tau \\ 0, & D_{ij} < \tau \end{cases} \quad (2)$$

where $\tau$ is the threshold. Then each adjacency matrix A for each corpora pairing is populated into a cumulative adjacency matrix A. Finally, a common neighbors similarity matrix S is calculated by multiplying the cumulative adjacency matrix A by the transposed cumulative adjacency matrix A:

$$S = A \times A^T \quad (3)$$

The common neighbors similarity matrix contains all of the common neighbor similarity measurements for each corpus pairing. After the calculating the common neighbors similarity matrix and thus all of the common neighbor similarity measurements for each corpus pairing, the process proceeds to step 206.

In step 206, a decision action determines if the common neighbors similarity measurement exceeds the threshold. If the common neighbors similarity measurement does not exceed the threshold, the at least two corpora of contracts maintain a non-merge of the at least two corpora of contracts 206b. Put another way, the two corpora of contracts are not merged and remain individual corpora. On the other hand, if the common neighbors similarity measurement exceeds a threshold, the at least two corpora of contracts are merged into a cluster of contracts 206a. For example, a contract corpus merges with another contract corpus based on the common neighbor similarity measurement into a merged set of corpora (i.e., a cluster). Other contract corpora maintain as individual corpora and not merge. In some embodiments, once a common neighbor similarity measurement is calculated and the two corpora are merged into a cluster, a centroid for the two merged corpora is re-calculated because a merged set of corpora (i.e., a cluster) now exists. Estimating cluster centroids requires performing summation over all the documents in a cluster for every single cluster. In a cluster with n documents and m words, estimating a cluster centroid is independent of the number of clusters.

For example, let $a_i(j, k)$ be the $k^{th}$ word of $j^{th}$ document in cluster i. The cluster centroid $C_i$ is calculated as follows:

$$A_i(k) = \sum_{j=1}^{n_i} a_i(j, k), k = \{k \mid k \in n, k \le m\} \quad (4)$$

$$C_i(k) = \frac{A_i(k)}{n_i} \quad (5)$$

where m is the number of words, and $n_i$ is the size of cluster i. Furthermore, suppose q clusters are to be merged. The estimated centroid of the new cluster after merging without performing summation on all documents in the cluster is as follows:

$$C_e(k) = \sum_{i=1}^{q} C_i(k) \quad (6)$$

However, the actual centroid of the new cluster is calculated by performing summation on all documents in the cluster.

$$C(k) = \frac{\sum_{i=1}^{n_i} A_i(k)}{\sum_{i=1}^{q} n_i} \quad (7)$$

In each merging, the centroids of collaborating clusters are reused and the estimated centroid is adjusted by $\Delta$.

$$C(k) = C_e(k) + \Delta(k) \quad (8)$$

$$\Delta(k) = \frac{-\sum_{i=1}^{q} \left( \sum_{j=1}^{q} n_j \prod_{j=1}^{q} n_j A(k)_i \right)}{\sum_{i=1}^{q} n_i \prod_{i=1}^{q} n_i} \text{ where } i \ne j \quad (9)$$

Reusing the estimated centroid and adjusting by $\Delta$ in each merging has an advantage over the direct calculation method by improving the performance time. Referring back to FIG. 2, steps 206, 206a and/or 206b continue until all corpus and/or cluster pairings have a decision action outcome. After the decision actions are made, a contract taxonomy 260 (see FIG. 2A) emerges.

Figure 2A:
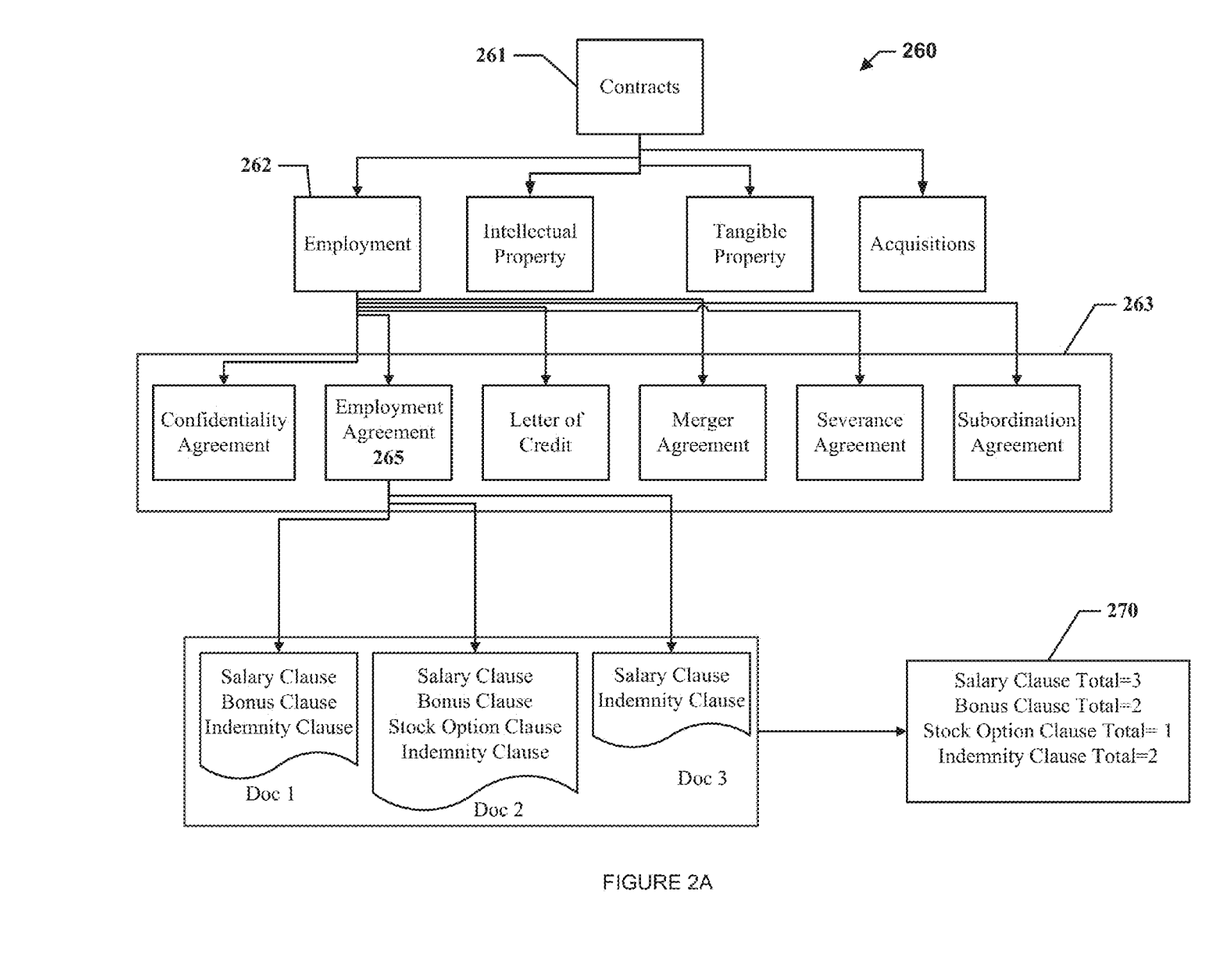
FIG. 2A is an exemplary contract taxonomy 260 which corresponds to one or more embodiments of the invention.

FIG. 2A includes an exemplary contract taxonomy 260. In some embodiments, only a partial view of the contract taxonomy is displayed to the user on access device 130 (see FIG. 4 for an exemplary user interface for displaying a set of clusters 263 to the user.) For example, contract taxonomy 260 includes a set of contract clusters 263. Within the set of contract clusters 263 resides, for instance, employment agreement cluster 265. Each contract cluster, within the set of clusters 263, is also called a leaf node because the contract cluster contains the contract documents associated with that cluster. For example, the employment agreement cluster 265 is a leaf node because it contains contract documents Doc1, Doc2 and Doc3. An internal node is at least a parent node or higher in the taxonomy structure. For example, in FIG. 2A, the set of contract clusters 263 is also an example of a set of leaf nodes and the nodes higher in the contract taxonomy 260 (e.g., Employment node 262 and Contracts node 261) are examples of internal nodes. The Contracts node 261 is an internal node as well as the root node for the contract taxonomy 260.

A leaf node is labeled by using the most frequent contract document title from within the contract documents in the leaf node. An internal node is labeled by using the most frequent un-stemmed word or words within the all the contract documents the internal node includes. For example, the Employment node 262 is an internal node. Employment node 262 has a parental relationship to the set of contract clusters 263 which contain the contract documents (e.g., Doc1, Doc2, Doc3, etc.). The label "Employment" for the Employment node 262 occurred because the top stemmed word was "employ." Once the top stemmed word was determined, another listing is consulted to determine the most frequent un-stemmed version of "employ" within the contract documents of the employment node 262. In this instance, the most frequent un-stemmed version of "employ" is "employment." Thus the label for the Employment node 262.

Once the contract taxonomy 260 has been initially created via the steps 202-206, some embodiments further populate the contract taxonomy 260 by placing the orphans within the taxonomy. Orphans did not meet the static or dynamic grouping threshold. In order to place those orphaned contracts into the contract taxonomy 260, one skilled in the art may use a classifier to determine the "best fit" into the contract taxonomy 260 or may have a manual process of determining where in the contract taxonomy 260 the orphans should be placed. In one embodiment, the classifier may use systems, methods described in the following U.S. patents: U.S. Pat. Nos. 7,062,498 and 7,580,939. Each U.S. patent is herein incorporated by reference.

Contract clauses are clustered in an almost identical fashion to the contracts, the significant difference being the defined set of conceptually-related portions of text being clustered. For contracts, all the contracts were considered when applying the static or dynamic grouping threshold. Whereas for contract clauses, only the contract clauses within an individual contract cluster are considered when applying the static or dynamic grouping threshold. Furthermore, the contract clause clustering process occurs as many times as there are contract clusters. Referring back to FIG. 2A, there are a set of contract clusters 263. The set of contract clusters 263 contains six individual contract clusters. Therefore, the contract clause clustering process occurs six times before completion. In addition, the contract clause clustering process only clusters the clauses within an individual contract cluster. For example, employment agreement cluster 265 contains contracts Doc1, Doc2 and Doc3. Only the contract clauses within those contracts are clustered. This enables the contract clause clusters to directly relate to the contract cluster and thus the contract taxonomy 260. For example, once the contract clause clustering is complete on employment agreement cluster 265, a listing of the contract clause clusters 270 is created and a signal containing the listing of contract clause clusters 270 is transmitted, via the wireless or wireline transmission channel 150, and ultimately displayed to the user on access device 130 (see FIG. 4 for an exemplary user interface illustrating a listing of contract clause clusters 270). Referring back to FIG. 2, after the contract taxonomy 260, including the set of contract clusters 263 and contract clause clusters 270, is populated, the process advances to step 208.

In step 208, a cluster of either contracts or contract clauses is received and analyzed by analysis module 140b to develop a model. A separate, independent model is created for each contract cluster and for each contract clause cluster. Developing an exemplary contract clause model and an exemplary contract model are each described herein using steps 208-212.

Steps 208-212 for Exemplary Contract Clauses

In step 208 for contract clauses, prior to developing an exemplary contract clause model, a dictionary is created of all the words within all the contracts. Some embodiments may remove stop words from the dictionary for processing optimization. Other embodiments include only having a stemmed version of the word included in the dictionary. After the dictionary is created, the probability of each word's occurrence in a sentence within a contract clause cluster is calculated. Referring back to FIG. 2A, the contract taxonomy 260 includes a listing of the contract clause clusters 270, wherein an exemplary contract clause cluster is Salary Clause. Since the sentence probability only counts sentences, one occurrence of a word in a single sentence is recorded regardless of how many times the word actually occurs within that single sentence. Therefore, if a word is used twice in a sentence, the word only occurs once for purposes of deciding if the word occurs in the sentence. The sentence probability is calculated by:

$$\frac{\left(\begin{array}{c}\text{Total Number of Sentences Word }X\\ \text{Occurs in Each Contract Clause Cluster}\end{array}\right)}{\left(\begin{array}{c}\text{Total Number of Sentences in}\\ \text{Each Clause Cluster}\end{array}\right)} \quad (10)$$

For instance, if the word "severance" occurs in 30 sentences within contract clause cluster "Salary Clause" and there are 1,000 sentences within the contract clause cluster "Salary Clause," then the sentence probability that the word "severance" occurs in a sentence within the contract clause cluster "Salary Clause" is (30)/(1,000)=0.03. In some embodiments, the probabilities of words in sentences are actually smoothed. Smoothing means that even if a word never occurs within a sentence of a clause of a particular clause cluster, the probability of that word is not 0. Several smoothing techniques are known to those skilled in the art. After all the sentence probabilities of each word are calculated, a model is developed by having a word and corresponding sentence probability matrix. For example, contract clause cluster A has the following model:

| Word | (# of Sentences Word X Occurs Within Contract Clause Cluster A)/(Total # of Sentences Within Contract Clause Cluster A) |
|---|---|
| Severance | (300)/(3,000,000) = 0.0001 |
| Salary | (0)/(3,000,000) = 0 |
| Negotiate | (1,000,000)/(3,000,000) = 0.3333 |

This exemplary model shows the word "salary" does not occur in a sentence within contract clause cluster A. Therefore "salary" would not be a word to use for a contract clause cluster A model. However, the word "negotiate" has a probability of 0.3333. Thus, compared to all the other probabilities listed, "negotiate" has the highest probability of being used in a contract clause cluster A model. After each contract clause cluster is analyzed and a model is developed, the process continues to step 210.

In step 210 for contract clauses, a novelty measurement is calculated between an identified sentence and the contract clause cluster model. First, a model probability is calculated by:

$$\frac{\left(\begin{array}{c}\text{Total Number of Word }X\text{ Occurrences}\\ \text{in Sentence }Y\end{array}\right)}{(\text{Total Number of Words in Sentence }Y)} \quad (11)$$

If there is no word X occurrence in sentence Y then the total number of word X occurrences in sentence Y is 0. In some embodiments where a word occurrence happens only once per sentence, the total number of word X occurrences in sentence Y is 1. Continuing this example, if the total number of word X occurrences in sentence Y is 1 and the total number of words in sentence Y is 5 then the sentence probability is (1)/(5)=0.2. Second, the two sets of probabilities, the model probability and each sentence probability, are compared to each other using the Kullback-Leibler (KL) divergence method. See http://en.wikipedia.org/wiki/Kullback%E2%80%93Leibler_divergence. While this exemplary embodiment uses the KL divergence method, one skilled in the art would appreciate and utilize other equivalent divergence methods. Once the KL divergence values are calculated, a mean and standard deviation are calculated based on the KL divergence values for the contract clause cluster. The standard deviation is a calculation between the mean contract clause KL and the contract clause KL. Then, a normalized KL divergence value is calculated by:

$$\frac{(\text{Contract Clause }KL - \text{Mean Contract Clause }KL)}{(\text{Standard Deviation})} \quad (12)$$

The normalized KL divergence value is then passed on to the normal cumulative distribution function in order to receive the probability of the corresponding sentence being in the contract clause cluster model. Normal cumulative distribution function is well known to those skilled in the art. For example, there is a KL divergence value of 5 between contract clause cluster A model and sentence Y. After the mean and standard deviation are calculated, a normalized KL divergence value is calculated to be 4.5. The normalized KL divergence value is then passed on to the normal cumulative distribution function in order to receive the probability of the sentence Y being in the contract clause cluster A model. The probability of the sentence Y being in the contract clause cluster A model is an example of a novelty measurement between sentence Y and the contract clause cluster A model. In some exemplary embodiments, the novelty measurement is associated with a conformity measurement (1-novelty measurement). For example, if the novelty measurement is 0.03 then the conformity measurement is 0.97. Continuing from the current example, all the conformity measurements from each sentence within an individual contract clause are aggregated and averaged to determine a score for the individual contract clause. In other embodiments, all the novelty measurements from each sentence within an individual contract clause are aggregated and averaged to determine a score for the individual contract clause. Some exemplary scores directly use the novelty measurement, for example, if the novelty measurement is 0.3 then an exemplary score might be 3 (0.3 multiplied by 10 for score above 0). Other exemplary scores indirectly use the novelty measurement by calculating the conformity measurement from the novelty measurement, for example, if the novelty measurement is 0.3 then an exemplary score might be 7 (1-0.3 multiplied by 10 for score above 0). Either way, after each novelty or conformity measurement and its corresponding score are calculated, the process executes step 212.

In step 212 for contract clauses, an identified contract clause and a score associated with a novelty measurement are transmitted from a server 120 to an access device 130 through a signal via a wireless or wireline transmission channel 150. The score being transmitted is the score for the identified contract clause. For example, FIG. 6 includes two examples of contract clauses and corresponding scores. In this particular embodiment, conformity measurements are calculated, averaged and multiplied by 10 so the range of conformity scores is 0 to 10.

In some exemplary embodiments, in step 210 for contract clauses, instead of having an identified sentence, an identified contract clause is used. Steps 210-212 for contract clauses stay essentially the same except for following two adjustments. First, instead of a sentence probability, a contract clause probability is calculated by:

$$\frac{\left(\begin{array}{c}\text{Total Number of Word } X \\ \text{Occurrences in Contract Clause } Y\end{array}\right)}{\text{(Total Number of Words in Contract Clause } Y\text{)}} \quad (13)$$

Second, unlike the sentence novelty measurements being aggregated and averaged, once the normal cumulative distribution function probability is determined, the contract clause probability is the contract clause novelty measurement. Therefore aggregating and averaging of novelty measurements is not necessary.

Steps 208-212 for Exemplary Contracts

In step 208 for contracts, the probability of a contract clause existing within a contract is calculated by:

$$\frac{\left(\begin{array}{c}\text{Total Number of Occurrences of} \\ \text{Contract Clause Within a Contract Cluster}\end{array}\right)}{\left(\begin{array}{c}\text{Total Number of Contracts} \\ \text{Within a Contract Cluster}\end{array}\right)} \quad (14)$$

After all the contract clause probabilities are calculated, a contract cluster model is developed by having a clause and corresponding clause probability matrix. For example, contract cluster A has the following model:

| Clause | (Total Number of Occurrences of Contract Clause Within a Contract Cluster A)/(Total Number of Contracts Within a Contract Cluster A) |
|---|---|
| Bonus Clause | (3,000)/(3,000,000) = 0.001 |
| Salary Clause | (0)/(3,000,000) = 0 |

This exemplary model shows the contract clause "Salary Clause" does not occur within contract cluster A. Therefore, "Salary Clause" would not be a clause to use for a contract cluster A model. However, the word "Bonus Clause" has a probability of 0.001. Thus, compared to all the other probabilities listed, "Bonus Clause" has the highest probability of being used in a contract cluster A model. After each contract cluster is analyzed and a model is developed, the process continues to step 210.

In step 210 for contracts, the novelty measurement calculation starts with calculating a contract clause value. A contract clause value multiplies (Probability of a Contract Clause Existing within a Given Contract (see Step 208 for contracts)) by (Individual Contract Clause Novelty Measurement). A contract clause value is calculated for each contract clause with a given contract. Then all the contract clause values for the given contract are summed to calculate the un-normalized contract novelty measurement. Once the un-normalized contract novelty measurements are calculated for each contract, a mean and standard deviation are calculated based on the un-normalized contract novelty measurement for the contract. Then, a normalized contract novelty measurement is calculated by:

$$\frac{\left(\begin{array}{c}\text{UnNormalized Contract Novelty Measurement}- \\ \text{Mean Contract Novelty Measurement}\end{array}\right)}{\text{(Standard Deviation)}} \quad (15)$$

The normalized contract novelty measurement is then passed on to the normal cumulative distribution function in order to obtain the probability of the corresponding contract being in the contract cluster model.

In step 212 for contracts, an identified contract and a score associated with the novelty measurement are transmitted from a server 120 to an access device 130 through a signal via a wireless or wireline transmission channel 150. The score being transmitted is the score for the identified contract. For example, FIG. 6 includes an example of contract and its corresponding score. In this particular embodiment, conformity measurements are calculated and multiplied by 10 so the range of conformity scores is 0 to 10.

In some exemplary embodiments, in step 210 for contracts, instead of having an identified contract clause, an identified contract is used. Steps 210-212 for contracts stay essentially the same except for two adjustments. First, instead of a contract clause probability, the contract probability is calculated by:

$$\frac{\left(\begin{array}{c}\text{Total Number of Occurrences of Word } X \\ \text{Within a Contract Cluster}\end{array}\right)}{\left(\begin{array}{c}\text{Total Number of Words} \\ \text{Within a Contract Cluster}\end{array}\right)} \quad (16)$$

Second, once the contract probability is calculated, a KL divergence value and a normalized KL divergence value are calculated similar to the steps for contract clauses described above. Next, the normalized KL divergence value is passed to a normal cumulative distribution function to determine a contract novelty measurement. Therefore, aggregating and averaging of novelty measurements is not necessary.

Exemplary Interfaces

FIGS. 3-6 show exemplary interfaces 300-600, respectively, for system 100 and method 200, which may be adapted to incorporate the capabilities, functions, systems and methods of the present invention.

Figure 3:
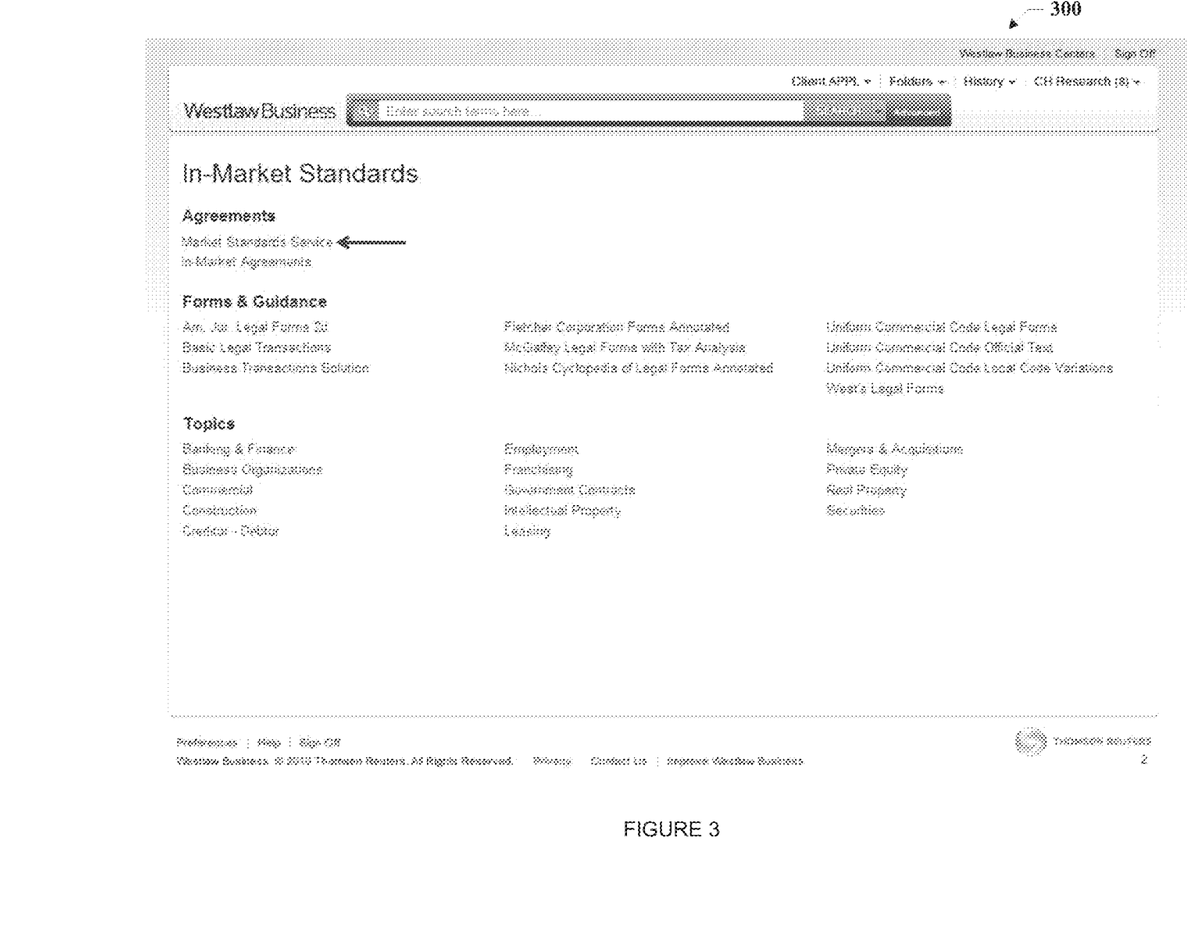
FIG. 3 is an exemplary interface 300 which corresponds to one or more embodiments of the invention.
Figure 4:
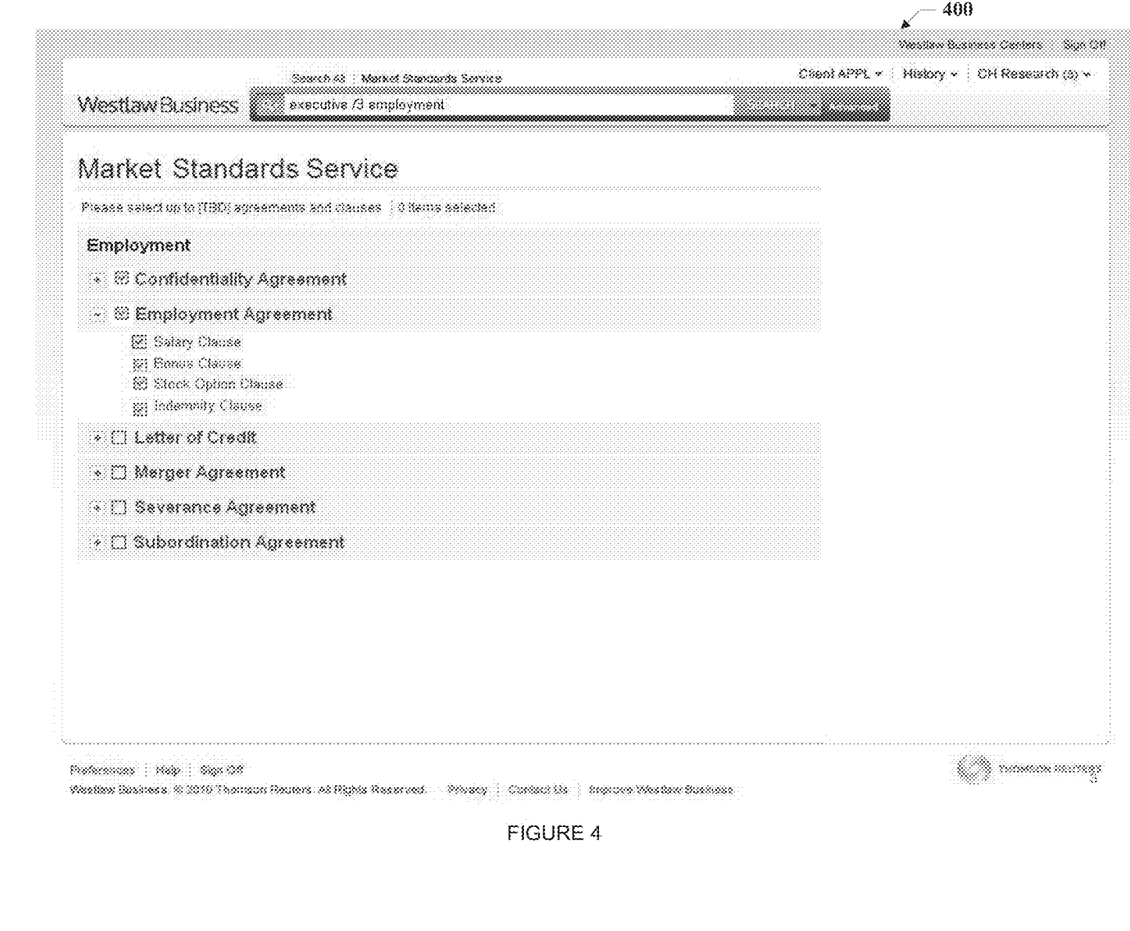
FIG. 4 is an exemplary interface 400 which corresponds to one or more embodiments of the invention.

FIG. 3 illustrates an exemplary interface 300 of display 1381 on an access device 130, for example, a laptop. The display 1381 depicts an access point for a user to initiate system 100, via method 200. The user selects the hyperlink "Markets Standard Service." The selection navigates the user to a table of contents (i.e., a contract taxonomy 260 or a portion of the contract taxonomy 260) for all contracts located within the content database 124. FIG. 4 illustrates an exemplary interface 400 of part of a contract taxonomy 260 along with a contract clause listing 270. A user may then search this partial contract taxonomy by 1) clicking the hyperlink of any one contract or contract clause cluster to retrieve all of the contracts or contract clauses of that contract type from the content database 124 or 2) checking a box next to one or more of the contract and/or contract clause clusters along with entering a query (i.e., search terms) at the top of the display 1381. For example, in FIG. 4 the user has selected Confidentiality Agreement contract cluster, Employment Agreement contract cluster, Salary Clause contract clause cluster, Bonus Clause contract clause cluster, Stock Option Clause contract clause cluster, Indemnity Clause contract clause cluster along with entering a query of "executive/3 employment." This selection gathers all the contracts and contract clauses from the selected contract clusters and contract clause clusters and retrieves only the contracts and contract clauses that have the relevant search terms.

Figure 5:
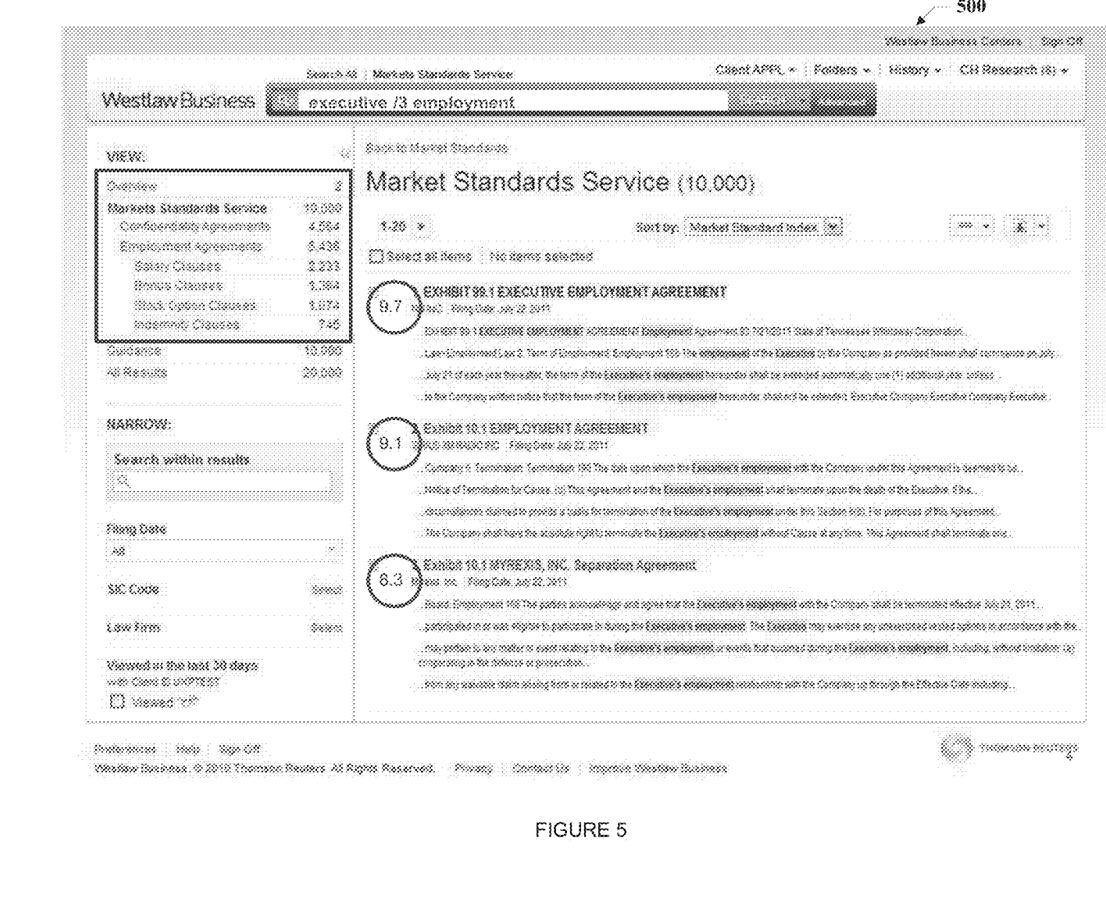
FIG. 5 is an exemplary interface 500 which corresponds to one or more embodiments of the invention.

FIG. 5 is an exemplary interface 500 displaying the results of the example query mentioned in FIG. 4. These results are transmitted from a server 120 to the access device 130 through a signal via a wireless or wireline transmission channel 150 and the results include a second identified conceptually-related portion of text (e.g., contract clause and/or contract) and a score associated with novelty measurement of the first identified conceptually-related portion of text (e.g., a sentence and/or a contract clause). For instance, in FIG. 5, three contracts from the selected contract clusters are displayed to the user as having the required search terms. In addition, a score is populated next to each contract notifying the user of the conformity of the contract to the contract cluster model.

Figure 6:
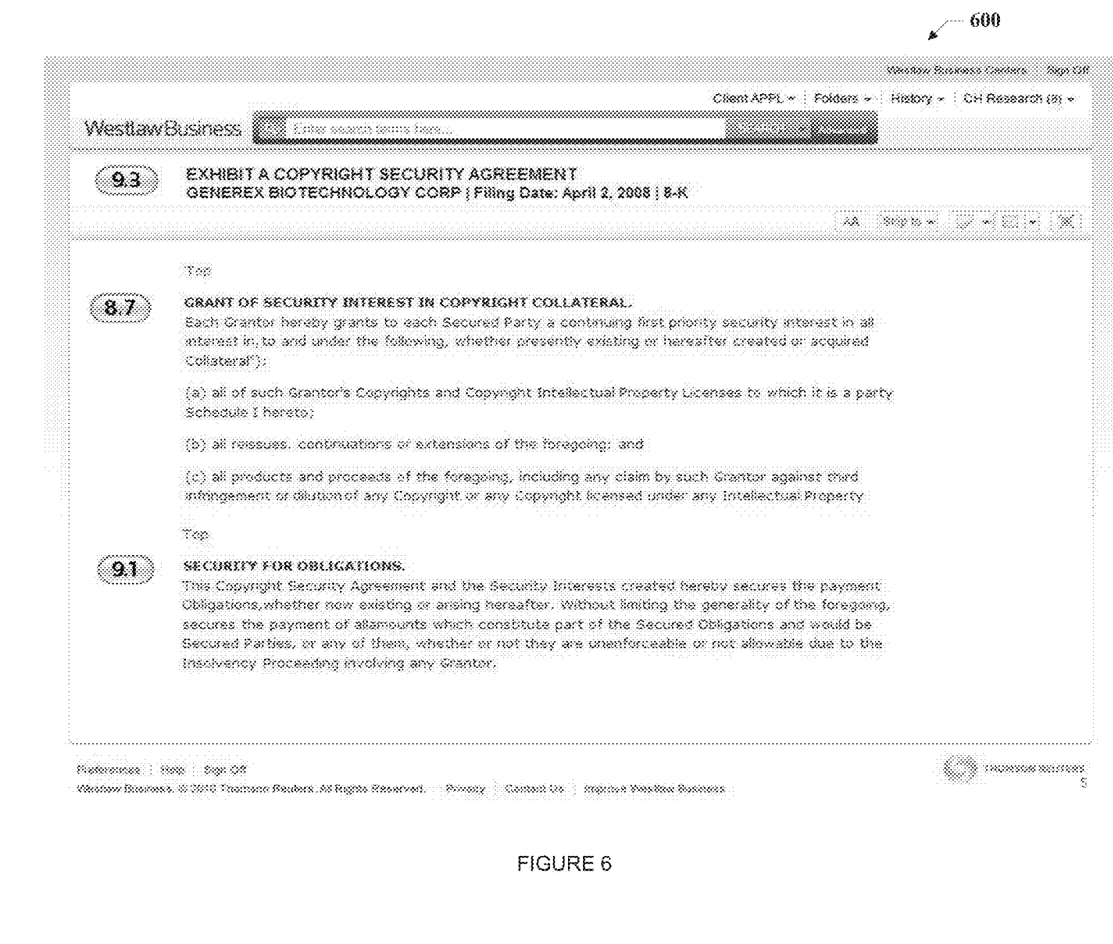
FIG. 6 is an exemplary interface 600 which corresponds to one or more embodiments of the invention.

FIG. 6 shows an exemplary interface 600 of display 1381 which depicts another access point for a user to utilize system 100, via method 200. While viewing a contract within system 100, the user may click on a score provided next to the contract title or the contract clause title. The score is associated to a contract or contract clause which in turn is associated to its contract cluster or contract clause cluster. By clicking on a score, the search module 123 initiates a search within content database 124 to retrieve all the contracts or contract clauses that are part of the selected contract cluster or contract clause cluster. Once retrieved, the results of all the contracts or contract clauses that are part of the selected contract cluster or contract clause cluster are displayed to the user. This access point benefits the user to see other, comparable contract or contract clauses to the contract or contract clause that is currently being viewed.

Other exemplary embodiments include processes for adding new conceptually-related portions of text (e.g., contracts and/or contract clauses) into system 100, via method 200. For example, one process receives of the first identified conceptually-related portion of text (e.g., a contract) to come from a third party such as an attorney and/or law firm. The contract, for instance, is uploaded to the processing program 140 and method 200 is executed. Another example includes a process of uploading a new contract and manually editing the contract taxonomy 260 to add another contract cluster, instead of executing method steps 202-208, because the new contract does not logically belong in an existing contract cluster. The same logic applies to contract clauses and/or any other conceptually-related portions of text. Yet another example includes a process for bypassing the method steps 202-208 and just classifying the new contract into the contract taxonomy 260. In addition, a score for the new contract and each corresponding contract clause are calculated, transmitted and ultimately displayed to the user. This example allows for faster processing and display times by not having to initiate steps 202-208. However, in this classifying example, the new contract is not used in developing the model because steps 202-208 are bypassed. Yet, due to the volume of contracts being analyzed, one new contract should not significantly affect the development of a contract model.

The embodiments described above and in the claims are intended only to illustrate and teach one or more ways of practicing or implementing the present invention, not to restrict its breadth or scope. For example, the processing program 140 may be executed prior to a user initiation (i.e., pre-processing) or the processing program 140 may be executed by a user initiated event (e.g., a user submits a draft contract to be analyzed "on the fly" against a contract corpus). In another example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

The invention claimed is:

1. A method comprising:
analyzing a first cluster of conceptually-related portions of text to identify a probability for each of the one or more portions of texts within the first cluster of conceptually-related portions of text, wherein the first cluster of conceptually-related portions of text comprises one or more contracts and each of the one or more contracts comprises one or more contract clauses and wherein the probability is calculated based on the number of occurrences of a given contract clause divided by the total number of contracts in the first cluster of conceptually-related portions of text;
developing a model based on the one or more probabilities corresponding to the one or more portions of texts within the first cluster of conceptually-related portions of text;
calculating a novelty measurement between a first identified conceptually-related portion of text and the model; and
transmitting a second identified conceptually-related portion of text and a score associated with the novelty measurement.

2. The method of claim 1, wherein the cluster of conceptually-related portions of text comprises contracts, the model comprises a model contract, the second identified conceptually-related portion of text comprises one or more contracts.

3. The method of claim 1, wherein the second identified conceptually-related portion of text each comprise one or more contracts.

4. A method comprising:
analyzing a first cluster of conceptually-related portions of text to identify a probability for each of the one or more portions of texts within the first cluster of conceptually-related portions of text, wherein the first cluster of conceptually-related portions of text comprises one or more sentences and wherein the probability is calculated based on the number of first time occurrences of a word in each of the one or more sentences divided by the total number of sentences in the first cluster of conceptually-related portions of text;

developing a model based on the one or more probabilities corresponding to the one or more portions of texts within the first cluster of conceptually-related portions of text;

calculating a novelty measurement between a first identified conceptually-related portion of text and the model; and transmitting a second identified conceptually-related portion of text and a score associated with the novelty measurement.

5. The method of claim 4 wherein the cluster of conceptually-related portions of text comprises contract clauses, the model comprises a model contract clause, and the second identified conceptually-related portion of text comprises one or more contract clauses.

6. The method of claim 4 wherein the first identified conceptually-related portion of text and the second identified conceptually-related portion of text are each contract clauses.

7. The method of claim 4 further comprising receiving a first identified conceptually-related portion of text from a third party.

8. The method of claim 4, wherein the first identified conceptually-related portions of a text is a paragraph.

9. The method of claim 4, wherein the first cluster of conceptually-related portions of text is generated by:
determining at least two corpora of conceptually-related portions of text;
calculating a common neighbors similarity measurement between the at least two corpora of conceptually-related portions of text; and
merging the at least two corpora of conceptually-related portions of text into the first cluster of conceptually-related portions of text where the common neighbors similarity measurement exceeds a threshold.

10. The method of claim 9 wherein the at least two corpora of conceptually-related portions of text comprises contracts, the cluster of conceptually-related portions of text comprises contracts and the model comprises a model contract.

11. The method of claim 9 wherein the at least two corpora of conceptually-related portions of text comprises contract clauses, the cluster of conceptually-related portions of text comprises contract clauses and the model comprises a model contract clause.

12. A system comprising:
a processor;
a memory coupled to the processor;
a processing program stored in the memory for execution by the processor, the processing program comprising:
an analysis module, the analysis module configured to:
analyze a first cluster of conceptually-related portions of text to identify a probability for each of the one or more portions of texts within the first cluster of conceptually-related portions of text, wherein the first cluster of conceptually-related portions of text comprises one or more contracts and each of the one or more contracts comprises one or more contract clauses and wherein the probability is calculated based on the number of occurrences of a given contract clause divided by the total number of contracts in the first cluster of conceptually-related portions of text; and
develop a model based on the one or more probabilities corresponding to the one or more portions of texts within the first cluster of conceptually-related portions of text;
a novelty module, the novelty module configured to calculate a novelty measurement between a first identified conceptually-related portion of text and the model; and
a transmission module, the transmission module configured to transmit a second identified conceptually-related portion of text and a score associated with the novelty measurement.

13. The system of claim 12, wherein the cluster of conceptually-related portions of text comprises contracts, the model comprises a model contract, the second identified conceptually-related portion of text comprises one or more contracts.

14. The system of claim 12, wherein the second identified conceptually-related portion of text each comprise one or more contracts.

15. A system comprising:
a processor;
a memory coupled to the processor;
a processing program stored in the memory for execution by the processor, the processing program comprising:
an analysis module, the analysis module configured to:
analyze a first cluster of conceptually-related portions of text to identify a probability for each of the one or more portions of texts within the first cluster of conceptually-related portions of text, wherein the first cluster of conceptually-related portions of text comprises one or more sentences and wherein the probability is calculated based on the number of first time occurrences of a word in each of the one or more sentences divided by the total number of sentences in the first cluster of conceptually-related portions of text; and
develop a model based on the one or more probabilities corresponding to the one or more portions of texts within the first cluster of conceptually-related portions of text;
a novelty module, the novelty module configured to calculate a novelty measurement between a first identified conceptually-related portion of text and the model; and
a transmission module, the transmission module configured to transmit a second identified conceptually-related portion of text and a score associated with the novelty measurement.

16. The system of claim 15 further comprising a common neighbors module, the common neighbors module configured to:
determine at least two corpora of conceptually-related portions of text;
calculate a common neighbors similarity measurement between the at least two corpora of conceptually-related portions of text; and
merge the at least two corpora of conceptually-related portions of text into the first cluster of conceptually-related portions of text where the common neighbors similarity measurement exceeds a threshold.

17. The system of claim 16 wherein the at least two corpora of conceptually-related portions of text comprises contract clauses, the cluster of conceptually-related portions of text comprises contract clauses and the model comprises a model contract clause.

18. The system of claim 15 wherein the cluster of conceptually-related portions of text comprises contract clauses, the model comprises a model contract clause, and the second identified conceptually-related portion of text comprises a contract clause.

19. The system of claim 15 wherein the first identified conceptually-related portion of text and the second identified conceptually-related portion of text are each contract clauses.

20. The system of claim 15 wherein the novelty module is further configured to receive the first identified conceptually-related portion of text from a third party.

21. The system of claim 15, wherein the first identified conceptually-related portions of a text is a paragraph.

* * * * *